(12) United States Patent
Kerth et al.

(10) Patent No.: US 9,513,980 B2
(45) Date of Patent: Dec. 6, 2016

(54) TRANSPARENT DISTRIBUTION AND DECOUPLING OF MODULES USING ASYNCHRONOUS COMMUNICATION AND SCOPES

(75) Inventors: Rainer Kerth, Berlin (DE); Wolfgang Degenhardt, Buchenweg (DE)

(73) Assignee: SAP SE, Walldorf (DE)

( * ) Notice: Subject to any disclaimer, the term of this patent is extended or adjusted under 35 U.S.C. 154(b) by 889 days.

(21) Appl. No.: 12/907,645

(22) Filed: Oct. 19, 2010

(65) Prior Publication Data
US 2012/0096112 A1    Apr. 19, 2012

(51) Int. Cl.
G06F 15/16    (2006.01)
G06F 9/54    (2006.01)

(52) U.S. Cl.
CPC ................... G06F 9/548 (2013.01)

(58) Field of Classification Search
USPC ........... 709/203, 223, 217, 219, 224, 226, 228,709/232, 238; 717/104; 711/125, 104; 718/101; 707/100, 999.1; 719/329; 726/4
See application file for complete search history.

(56) References Cited

U.S. PATENT DOCUMENTS

| | | | |
|---|---|---|---|
| 7,337,188 B2* | 2/2008 | Somogyi et al. | 707/999.1 |
| 7,627,655 B2 | 12/2009 | Bozak et al. | |
| 2007/0067321 A1* | 3/2007 | Bissett et al. | 707/100 |
| 2008/0134183 A1* | 6/2008 | Somogyi et al. | 718/101 |
| 2009/0013305 A1* | 1/2009 | Clarke | 717/104 |
| 2009/0106780 A1* | 4/2009 | Nord et al. | 719/329 |
| 2010/0095066 A1* | 4/2010 | Rodgers et al. | 711/125 |
| 2010/0211662 A1* | 8/2010 | Glendinning et al. | 709/223 |
| 2011/0167105 A1* | 7/2011 | Ramakrishnan et al. | 709/203 |
| 2011/0173679 A1* | 7/2011 | Perumal et al. | 726/4 |

FOREIGN PATENT DOCUMENTS

JP    07-084923 A    3/1995

OTHER PUBLICATIONS

Wills, Craig E., "Remote Procedure Call (RPC)," *CS 4514 Computer Networks WPI, B Term 1998* (Oct. 29, 1998)—5 pages.
Tilevich, Eli, "NRMI: Natural and Efficient Middleware," *IEEE Transactions on Parallel and Distributed Systems*, vol. 19, No. 2 (Feb. 2008)—7 pages.
Parsa, Saeed, "Formal Specification and Implementation of an Environment for Automatic Distribution," Advances in Grid and Pervasive Computing; Lecture Notes in Computer Science; Springer Berlin Heidelberg (May 2, 2007)—6 pages.
(Continued)

*Primary Examiner* — Quang N Nguyen
(74) *Attorney, Agent, or Firm* — Brake Hughes Bellermann LLP

(57) ABSTRACT

Systems and methods consistent with the invention may include using asynchronous communication and scopes to transparently decouple modules and distribute load. Asynchronous communication may be achieved by using message queues or by using message topics. Scopes are introduced as a means to provide structure to resources associated with the decoupled modules and to improve the ability to distribute such resources necessary to process messages between modules. Furthermore, the use of asynchronous communication and scopes may be done automatically and transparently to the user and/or application developers.

12 Claims, 10 Drawing Sheets

(56) References Cited

OTHER PUBLICATIONS

International Search Report issued in PCT/IB2011/001276 dated Nov. 28, 2011 (12 pages).
Design Implementation of Distributed Shared Memoery Based on Scope Consistency, http://spectrum.library.concordia.ca/2006 (104 pages).
Asynchronous Programming Overview, http://msdn.microsoft.com/en-us/library/ms228964.aspx (4 pages).
Java Message Service API Overview, http://www.oracle.com/technetwork/java/overview-137943.html (1 page).
Best Practices for Maximizing Scalability and Cost Effectiveness of Queue-Based Messaging Solutions on Windows Azure, http://msdn.microsoft.com/en-us/library/windowsazure/hh697709.aspx (41 pages).
Asynchronous Call by Reference, http://forums.openg.org/index.php?showtopic=88 (2 pages).
Notice of Allowance for Japanese Application No. 2011-228726, mailed on Aug. 29, 2016, 3 pages.

\* cited by examiner

TRANSPARENT DISTRIBUTION AND DECOUPLING OF MODULES USING ASYNCHRONOUS COMMUNICATION AND SCOPES

BACKGROUND

1. Relevant Field

Systems and methods consistent with the present invention generally relate to decoupling modules using asynchronous communication and scopes.

2. Background Information

Businesses and other organizations generate and/or receive a variety of data items and electronic information (broadly referred to hereafter as "business data") during the course of their operation. For example in the context of cloud computing, the business data may be generated and/or received from computers of various entities located in different regions and/or countries. Accordingly, there is a need to improve distribution of business logic and transient business data, and logic to process this data, across a network of computers.

In the context of cloud computing, a server may receive and process requests from clients and other servers. The clients and other servers may be, for example, the computers of various entities located in different regions and/or countries. The server may handle the requests using a plurality of software modules. To execute these modules, the server needs to allocate a portion of server resources (e.g., memory, processing time, etc.) to a module. Additionally, modules of the server are typically "coupled." That is, for example, the modules may rely on the published functionality of other modules, share state by accessing the same global data or variables, etc.

Furthermore, in a cloud environment, updating coupled modules located on a single or on different computer systems can be problematic. Similarly, difficulties also arise when operators want to spontaneously scale coupled modules. Additionally, transmission of resources across a cloud environment may be difficult as server resources are generally allocated and used in a fairly unstructured manner. Accordingly, there is a need to enable the decoupling of modules using a more structured approach to server resource management.

SUMMARY

Consistent with one embodiment of the invention, a method for decoupling modules in a computer system and a computer-readable medium storing instructions for executing the method are disclosed. The method may include, for example, sending a message, by a first module in a first host, to a second module in a second host by means of asynchronous messaging; maintaining a context necessary to process the message in scopes managed in a scope hierarchy; sending, to the second host, a copy of the context; pausing the first module; receiving a response indicating that the message has been processed by the second module; receiving, from the second host, updates to the copy of the context; incorporating the updates into the context in the scope hierarchy; and resuming the first module on the first host.

Consistent with another embodiment of the invention, a computer system for hosting a module and managing resource allocation for the module is disclosed. The system may include, for example, a communication unit configured to send a message over a network; a memory storing a queue to for holding back the sending of a the message; and a resource manager. The resource manager may be for maintaining contexts in a scope hierarchy, creating a scope associated with the message, and merging one or more of the contexts with a received context.

Consistent with another embodiment of the invention, a computer system for hosting a module and managing resource allocation for the module is disclosed. The system may comprise a receiver for receiving a message for the module over a network; a processor for executing the module to process the message, a resource manager for allocating and releasing scopes including a scope associated with the message, and a context storage area for storing a copy of a context, the context containing resources of the scope associated with the message.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1A:
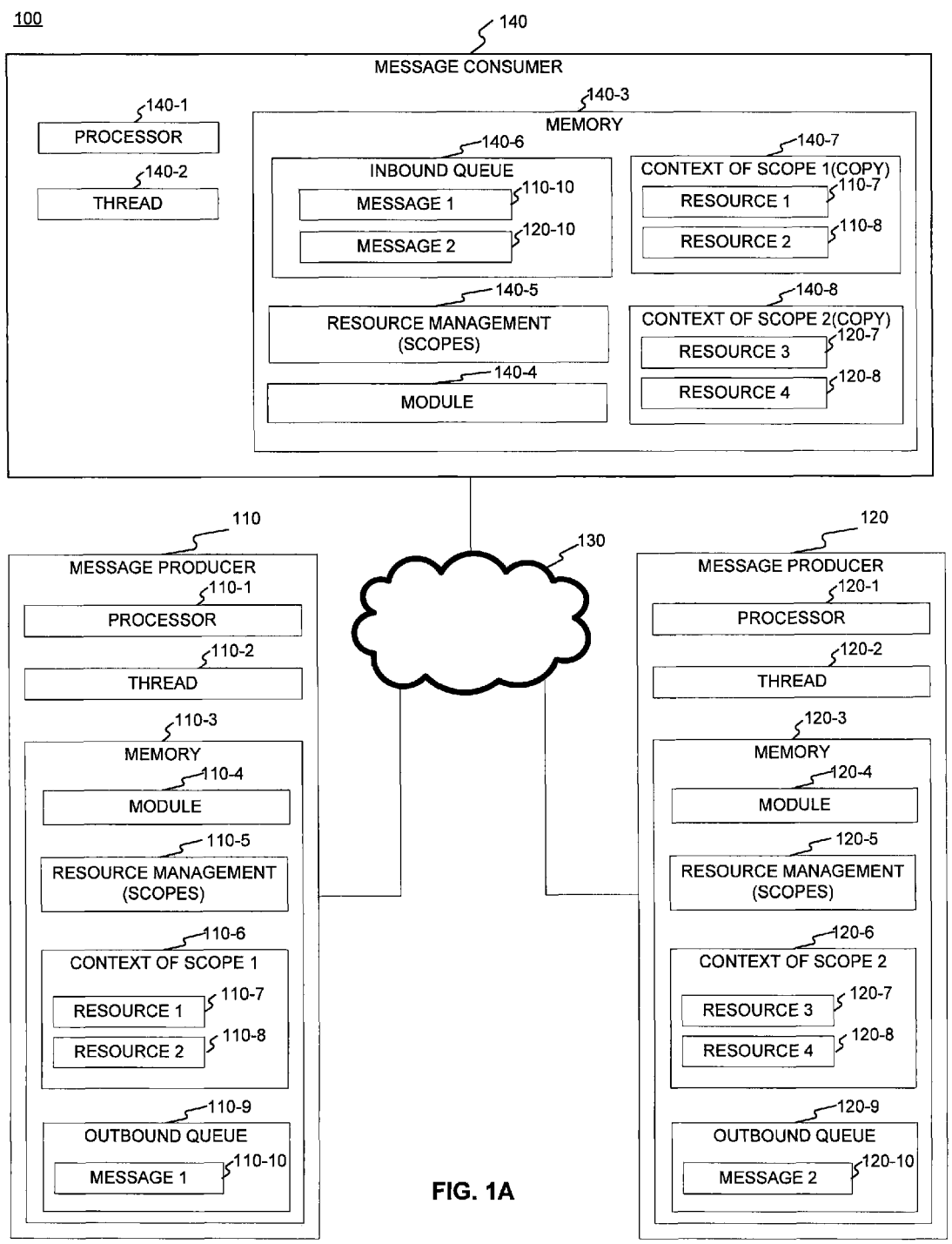
FIG. 1A illustrates an exemplary system for transparently decoupling modules, consistent with the present invention.

The following detailed description refers to the accompanying drawings. Wherever possible, the same reference numbers are used in the drawings and in the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Invention Overview

Systems and methods consistent with the invention generally relate to providing module decoupling and transparent distribution. Systems and methods consistent with the invention may be employed in cloud-computing environments. Transparent distribution and module decoupling may be achieved using asynchronous communication and scopes.

Figure 1B:
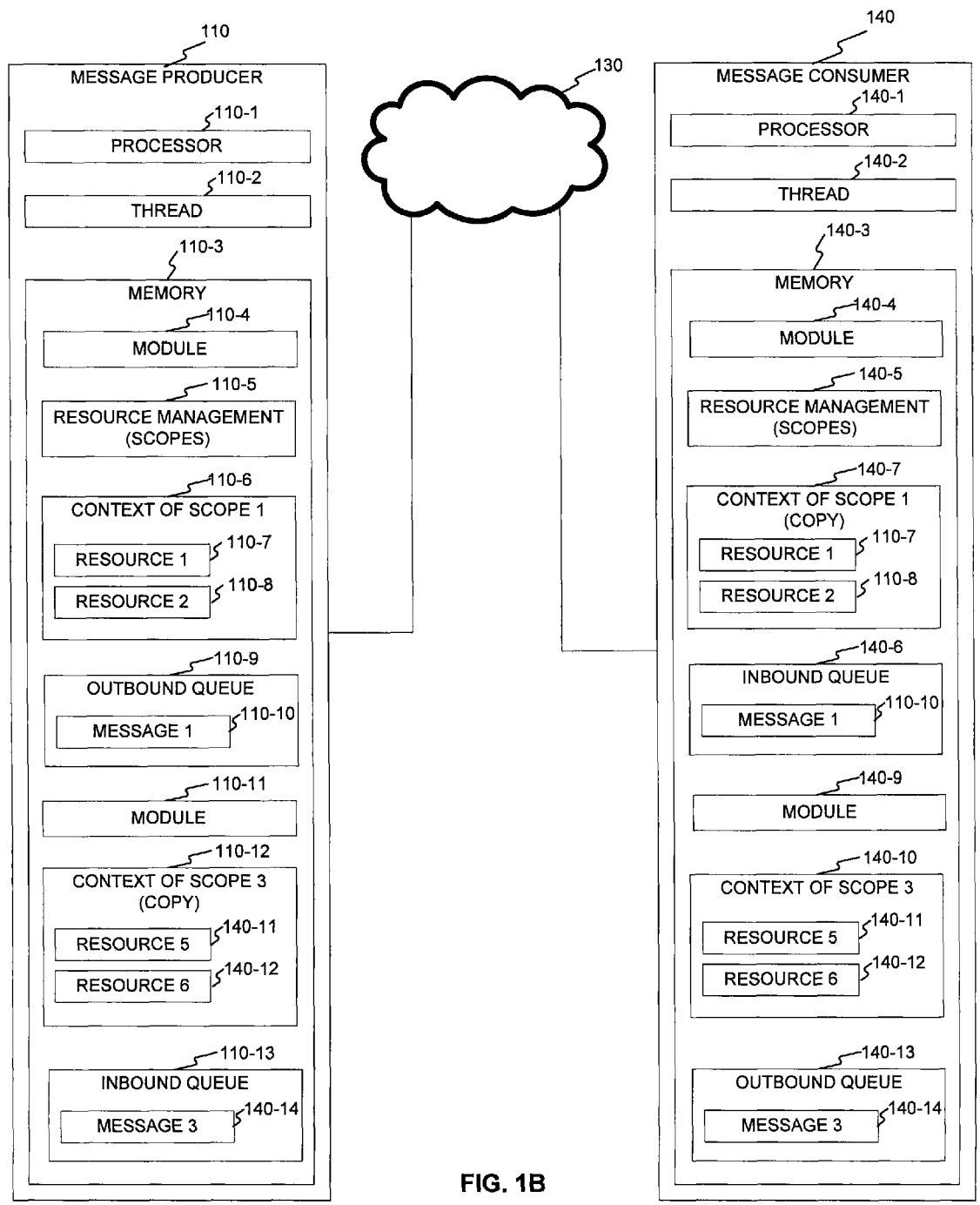
FIG. 1B illustrates another exemplary system for transparently decoupling modules, consistent with the present invention.

FIG. 1A depicts a system 100 consistent with the invention. System 100 depicts message producers 110 and 120 connected, by communication network 130, to a message consumer 140. For example, message producers 110 and 120 and message consumer 140 may be business computer systems. Message producers 110 and 120 and message consumer 140 may also be viewed at different levels of abstraction. For example, they may be viewed from the node level, covering the resources of the system as a whole, to a thread level, covering the resources of a thread. Additionally, users and clients of message producers 110 and 120 and message consumer 140 may be limited to a specific "security realm" of message producers 110 120 and message consumer 140. That is, for security purposes, users' and clients' access to certain resources of message producers 110 and 120 and message consumer 140 may be limited. Communication network 130 may facilitate communications between message producers 110 and 120 and message consumer 140. One skilled in the art will understand that the number of components 110, 120, and 140 shown in FIG. 1A are exemplary. Systems 100 consistent with the invention may thus include any number of message producers 110 or 120, or any number of message consumers 140. Another possible system is depicted in FIG. 1B, emphasizing the fact that message consumers and message producers may also be strictly symmetrical, allowing them to switch their respective roles at runtime.

Communication network 130 may include one or more network types, such as a wide-area network (WAN), a local-area network (LAN), or the Internet. Communication network 130 may operate by wireline and/or wireless techniques and may use a transmission control protocol/internet protocol ("TCP/IP") or any other appropriate protocol to facilitate communication between message producers 110 and 120 and message consumer 140 of system 100. Network connections within network 130 may be established via Ethernet, telephone line, cellular channels, or other transmission media. Data communications over network 130 may be facilitated by transmitting data packets between devices, such as message producers 110 and 120 and message consumer 140. The data transmissions described herein may be sent, for example, in a single data packet or divided across several data packets. Furthermore, message producers 110 and 120 may communicate asynchronously with message consumer 140 over network 130.

Message producers 110 and 120 and message consumer 140 of system 100 may comprise many infrastructures, such as a combination of one or more application programs and one or more hardware components. For example, application programs may include software modules, sequences of instructions, routines, data structures, display interfaces, and other types of structures that execute the disclosed operations of the present invention. The hardware components of message producers 110 and 120 and message consumer 140 may include a combination of Central Processing Units (CPUs), buses, memory devices, storage units, data processors, input devices, output devices, network interface devices, and other types of computer system components that would be apparent to those skilled in the art. Message producers 110 and 120 and message consumer 140 may thus be implemented by any type of computer device, such as a handheld device, a personal computer or a mainframe computer.

Message producers 110 and 120 and message consumer 140 may contain processors 110-1, 120-1, and 140-1, respectively. Processors 110-1, 120-1, and 140-1 may execute processes, and the processes may be divided into threads, such as threads 110-2, 120-2, and 140-2. Message producers 110 and 120 and message consumer 140 may further contain a memory 110-3, 120-3, and 140-3. Memories 110-3, 120-3, and 140-3 may include any form of computer-readable storage media, such as non-volatile or volatile memories, including, by way of example, semiconductor memory devices, such as EPROM, RAM, ROM, DRAM, EEPROM, and flash memory devices; magnetic disks, such as internal hard disks and removable disks; magneto-optical disks; and CD-ROM, DVD, or Blu-Ray disks.

Scopes and Contexts

Memories 110-3, 120-3, and 140-3 may each contain software modules, such as modules 110-4, 120-4, and 140-4. Modules 110-4, 120-4, and 140-4 may include instructions for execution by processors 110-1, 120-1, and 140-1, respectively. As discussed above, the instructions may be further divided into threads, such as threads 110-2, 120-2, and 140-2. Message producers 110 and 120 and message consumer 140 may each further include a resource management module, such as resource management modules 110-5, 120-5, and 140-5, for managing resources using "scopes." A "resource" may comprise anything necessary needed to execute a particular process, for example, in memory data structures, a database connection, or security permissions. A "scope" may comprise a plurality of resources grouped on a computer for a defined period of time. Examples of scope types are request scopes, user scopes, process scopes, etc. Additional examples of scope types will be discussed in further detail below. Message producers 110 and 120 and message consumer 140 may instantiate a scope type at runtime to create a scope instance. A scope instance may include a logical ID for identifying this instance during runtime. This ID may be globally unique (i.e., different scope instances of the same or of different scope types must have different IDs).

Resource management modules 110-5, 120-5, and 140-5 may associate resources with scope instances to clearly delineate the lifetime of any resources that are allocated inside system 100. In some embodiments, there may be no resources in system 100 that are not associated with a scope instance. In some embodiments of the invention, however, the owning scope instance may be very coarse-grained, that is, the scope instance may cover a large component of system 100 and may not be broken into smaller scope instances. For example, this setup may be appropriate in a system intended exclusively for local batch processing where no benefits stand to be gained from subdividing the scope instance below the granularity of a batch job. Resource management modules 110-5, 120-5, and 140-5 may manage resources by allocating them in and releasing them from a scope instance. Resource management modules 110-5, 120-5, and 140-5 may allocate resources to exactly one scope instance when they are created, and may remove resources from that scope instance when the resources are individually deleted. Resource management modules 110-5, 120-5 and, 140-5 may release resources when a scope instance owning the resources is released, e.g., due to a timeout. Resource management modules 110-5, 120-5, and 140-5 may define scope instances implicitly and thereby relieve the programmer from explicitly declaring memory regions, that is, a construct to allocate objects to. Furthermore, resource management modules 110-5, 120-5, and 140-5 may use scope instances to distribute locally-allocated objects in a network of collaborating nodes, such as message producers 110 and 120 and message consumer 140, to increase the transparency of remote communication.

Resource management modules 110-5, 120-5, and 140-5 may associate a scope instance with a defined storage area, called its "context." The context can be transient (in memory) or persistent (on disk). A context may be distinct from its associated scope instance in that a context may exist redundantly in system 100 whereas a scope instance usually is only active on a single message producer 110 or 120 or message consumer 140 at any given point in time. For example, in FIG. 1A, memory 110-3 of the message producer 110 contains a context of a first scope instance 110-6. Similarly, memory 120-3 of the message producer 120 contains a context of a second scope instance 120-6. Resource management module 110-5 may allocate any resources that are associated with a scope instance during its life. For example, the context of the first scope instance 110-6 contains allocated resources 110-7 and 110-8. Similarly, the context of a second scope instance 120-6 contains allocated resources 120-7 and 120-8.

Scope instances may migrate between message producer 110 and 120 and message consumer 140 by having one context in each of message producers 110 and 120 and message consumer 140. A resource management module, such as resource management modules 110-5, 120-5, and 140-5, may assign one of these contexts as a preferred instance to ensure that there are no excessive data movements between different machines. The preferred instance in a scope may be the one which by default handles all tasks related to this scope instance. Other context instances on other machines may be synchronized with this preferred instance of the context to avoid data inconsistencies within a given scope instance.

Asynchronous Communication

As shown in FIG. 1A, memories 110-3 and 120-3 may contain outbound queues 110-9 and 120-9, respectively. Outbound queues 110-9 and 120-9 may contain outbound messages 110-10 and 120-10, respectively. Context 110-6 may include resources necessary to process message 110-10, such as resources 110-7 and 110-8. That is, message 110-10 may be associated with the first scope instance, scope 1. Context 120-6 may include resources necessary to process message 120-10, such as resources 120-7 and 120-8. That is, message 120-10 may be associated with a second scope instance, scope 2. Memory 140-3 of message consumer 140 may include an inbound queue 140-6. The inbound queue 140-6 may include message 110-10 received from outbound queue 110-9 and message 120-10 received from outbound queue 120-9.

Similarly, as show in FIG. 1B, message consumer 140 may also contain other modules 140-9, and resource manager 140-5 may allocate contexts for scope instances such as context 140-10 including resources 140-11 and 140-12. Message consumer 140 may also contain an outbound queue 140-13 for sending messages 140-14 to message producers, such as message producer 110, or other message consumers. Message producer 110 may also contain an inbound queue 110-13 for receiving a message 140-14 from other message producers or from message consumer 140. Message producer 110 may process message 140-14 using module 110-4 or another module 110-11. Additionally, message producer 110 may also receive a copy of a context for message 140-14, i.e., context copy 110-12.

For example, suppose module 110-4 in FIG. 1B wishes to access a function of module 140-4, not knowing that module 140-4 resides on message consumer 140 which is separated from message producer 110 by a network 130. Module 110-4 may initiate a method invocation on a resource in memory 110-3 which represents module 140-4. This method invocation may be performed on thread 110-2. The invoked resource may then transform the method invocation into message 110-10, and thread 110-2 may put the message 110-10 on the outbound queue 110-9. Afterwards, thread 110-2 may be suspended or may be employed for other tasks in message producer 110 until a response message, such as message 140-14, or an acknowledgement is returned to message producer 110. Depending on the thread scheduling algorithm of the message producer 110, the same or a different thread 110-2 gets the response message, such as message 140-14, from the inbound queue 110-13 of message producer 110 and resumes processing of module 110-4 at the instruction step immediately following the original method invocation.

In order to process messages 110-10 and 120-10 in FIG. 1A, message consumer 140 may need access to the resources of scope instances associated with messages 110-10 and 120-10. To allow for this to happen, a system 100 consistent with the invention copies the context of the scope instances associated with messages 110-10 and 120-10 to the message consumer 140. In this process, the system 100 ensures that the data is synchronized between various copies of the contexts to prevent data corruption. Should the copy process require some time, system 100 may choose to delay the delivery of message 110-10 and 120-10 to the message consumer 140 until the copy process is completed. Accordingly, when messages 110-10 resp. 120-10 are processed in message consumer 140 then memory 140-3 includes a current copy of the context of the first scope instance 140-7 as well as a current copy of the context for the second scope instance 140-8.

The approach described in the two preceding paragraphs may permit system 100 to asynchronously execute a call that appears to be synchronous to modules 110-4 and 120-4 of FIG. 1A. Furthermore, the approach may also allow system 100 to perform remote calls with call-by-reference semantics since the current value of any references used during the call is made available to the message consumer 140. The combination of these two capabilities ensures that the use of the invention remains completely transparent to modules 110-4 and 120-4. That is, despite being executed in a distributed environment, modules 110-4 and 120-4 can continue to operate as if module 140-4 resided in the same memory 110-3 as modules 110-4 and 120-4.

Although the exemplary embodiment of system 100 is described as having particular components arranged in a particular manner, one skilled in the art will appreciate that system 100 may include additional or fewer components that may be arranged differently. For example, message producers 110 and 120 and message consumer 140 may include additional processors and/or memory devices. Further, the process instructions included in, for example, components 110-4, 110-5, 110-6, and 110-9, may be distributed across multiple memory devices. And as stated above, system 100 may be implemented with fewer or more message producers 110 and 120 and message consumer 140 than shown in FIG. 1A or 1B.

Figure 2:
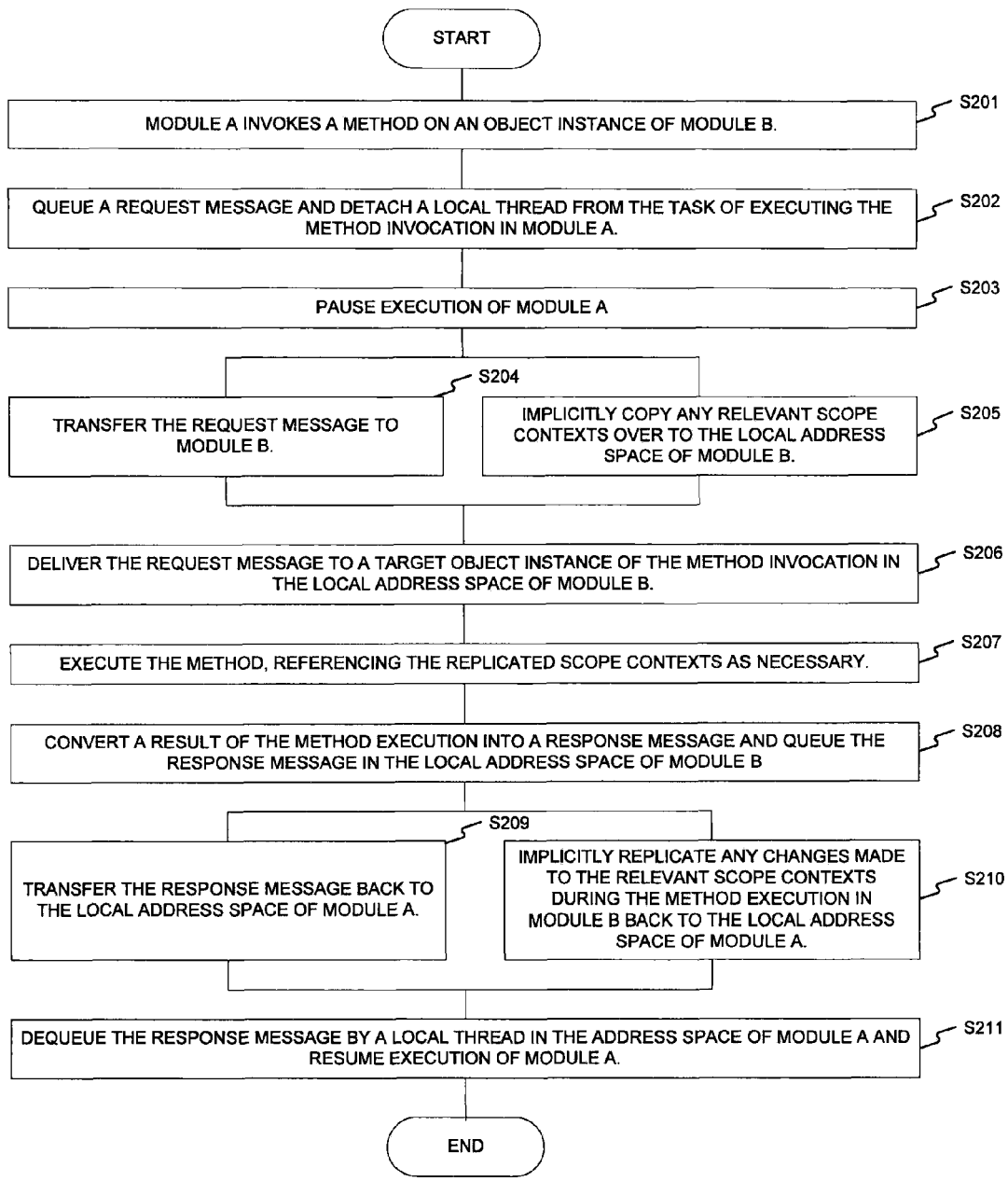
FIG. 2 illustrates an exemplary process for transparently decoupling modules, consistent with the present invention.

FIG. 2 illustrates an exemplary system for transparently decoupling modules using scopes, consistent with the present invention. In step S201, Module A, which may be located on one of message producers 110 and 120, invokes a method on an object instance of Module B, which may be located on message consumer 140. From the perspective of Module A, this is a local method invocation on an object instance in a local address space of Module A which represents an object instance of Module B. The message producers 110 or 120 may then queue the request message and detach the corresponding thread (e.g., threads 110-2 and 120-2) from the task of executing the method invocation in Module A (S202). This thread may then be used for other processing in the local address space of Module A. The detachment causes the execution of Module A to be paused for the duration of the method invocation (S203). Message provider 110 or 120 may then transfer the request message to Module B (S204). System 100 may also implicitly copy any relevant scope contexts over to the local address space of Module B (S205). There are three ways to do this: message attachment and proactive or reactive (i.e., on demand) out-of-band-replication (as discussed below in the section on Context Replication). Steps S204 and S205 may occur in parallel. System 100 then delivers the request message to the target object instance of the method invocation in the local address space of Module B (S206). Message consumer 140 executes the method, referencing the replicated scope contexts as necessary (S207). For example, if the method invocation made use of parameters then these parameters can be accessed from the replicated scope contexts. Message consumer 140 may then convert a result of the method execution into a response message and queue it in the local address space of Module B (S208). System 100 may then transfer the response message to the local address space of Module A (S209). System 100 may implicitly replicate any changes made to the relevant scope contexts during the method execution in Module B back to the local address space of Module A, using one of the three replication mechanisms detailed below (S210). Again, steps S209 and S210 may occur in parallel. Message producer 110 or 120 may then dequeue the response message by a thread (e.g., threads 110-2 and 120-2) in the address space of Module A and execution of Module A is resumed (S211). The thread dequeing the message may not be the same thread which launched the method invocation but it may have the same thread context as that original thread. During further execution of Module A, any relevant scope contexts may be accessed by Module A. Any changes made to resources allocated to such a context during the method invocation on Module B are visible to Module A.

Figure 3:
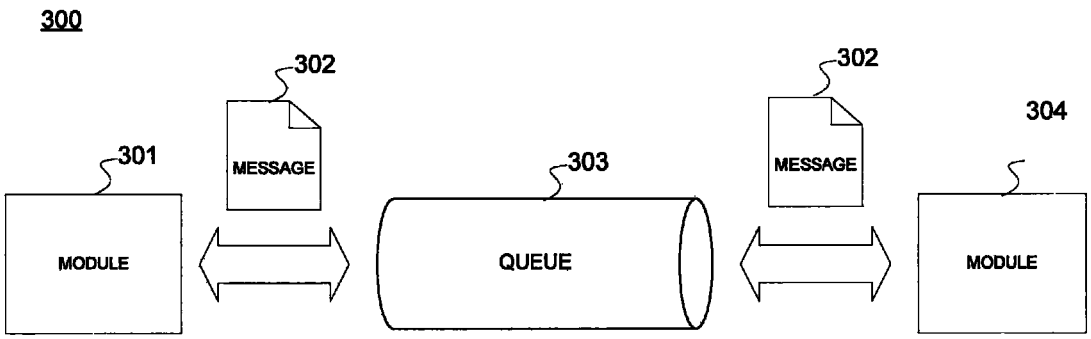
FIG. 3 illustrates an exemplary asynchronous communication using queues, consistent with the present invention.

System 100 may communicate asynchronously using queues, such as inbound queue 140-6. FIG. 3 depicts an exemplary asynchronous communication 300 using queues. As shown in FIG. 3, module 301 may send a message 302 to a queue 303. Then, module 304 may consume message 302. After consuming the message 302, the module 304 may acknowledge the consumption of message 302 to module 301. Message 301 may be a point-to-point message, that is, message 301 may have exactly one consumer. Furthermore, module 301 and module 304 may be located on different computers (not shown) connected over a network (not shown). The messaging infrastructure may support various Qualities of Service for message delivery, such as guaranteed-at-least-once or guaranteed-exactly-once-in-order delivery. Such Qualities of Service isolate certain network transmission errors in the transport layer and thereby increase the transparency of remote communication from the perspective of the module layer.

Figure 4:
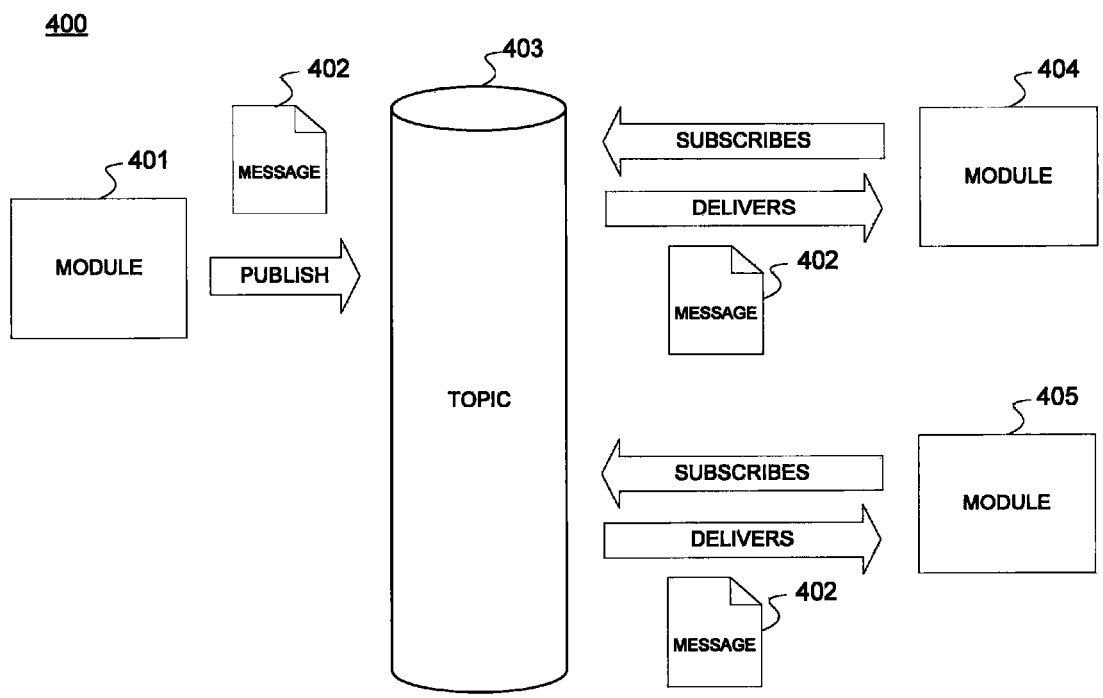
FIG. 4 illustrates an exemplary asynchronous communication using topics, consistent with the present invention.

System 100 may communicate asynchronously using "topics." A topic is a construct the messages meeting a certain criteria may be published to. FIG. 4 depicts an exemplary asynchronous communication 400 using topics. As shown in FIG. 4, module 401 may publish message 402 to topic 403. Modules 404 and 405 may subscribe to topic 403. That is, modules 404 and 405 may indicate that they wish to receive messages published to topic 403. Then, topic 403 may deliver message 402 to modules 404 and 405. In some embodiments consistent with asynchronous communication 400, modules 404 and 405 do not acknowledge consumption of message 402.

Embodiments consistent with the invention may use asynchronous communication as the default mechanism to decouple different modules that execute in system 100. In all such embodiments, asynchronous communication may be embedded into system 100 so that its use remains transparent to the participating modules. Asynchronous communication may, but does not have to, take place for any message between the coarse grained modules depicted, or between different modules defining the content of system 100. Using synchronous communication for inter module communication may increase the degree of coupling between modules and may reduce the applicability of various techniques described in this invention. However, the use of synchronous communication is considered in the context of this invention to be nothing but a temporary optimization, e.g. to improve performance on high frequency interactions between modules. In particular, it may be replaced by the default asynchronous communication at any time, thereby again reducing coupling between modules and enabling the use of various techniques described in this invention.

The decision to invoke a method asynchronously may be strictly an administrative one taken by the system administrator, not by the module developer. If so, the decision may be taken and also be reversed at runtime without restarting message producers 110 and 120 or message consumer 140.

Scope Hierarchies and Scope Types

Figure 5:
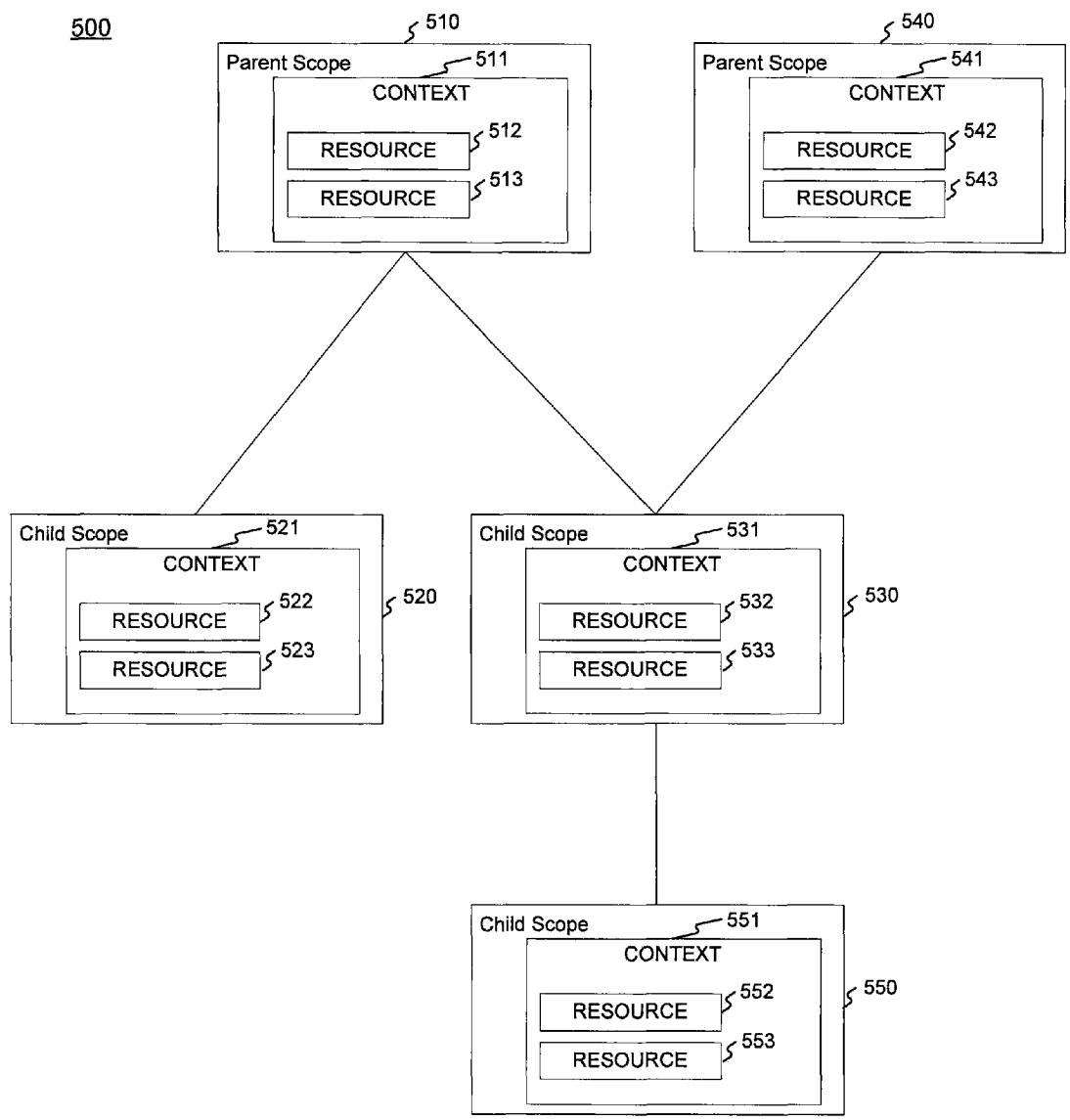
FIG. 5 illustrates an exemplary scope hierarchy, consistent with the present invention.

Scope instances are frequently organized in hierarchies. FIG. 5 depicts an exemplary hierarchy of scope instances 500. The exact shape of the hierarchy may be configurable in an embodiment of this invention as long as the hierarchy satisfies the constraint that a child scope instance does not outlive its parent scope instance. In hierarchy 500, scope instance 510 may have a context 511 that includes resources 512 and 513 allocated to scope instance 510. Scope instance 510 may serve as a parent to child scope instances 520 and 530. Child scope instance 520 may have a context 521 that includes resources 522 and 523 allocated to child scope instance 520. Similarly, child scope instance 530 may have a context 531 that includes resources 532 and 533 allocated to child scope instance 530. Child scope instance 530 may also be a child of parent scope instance 540 having its own context 541 and allocated resources 542 and 543. Child scope instance 530 may also serve as a parent to child scope instance 550 having its own context 551 and allocated resources 552 and 553. The hierarchy may be navigable from parent to child and from child to parent, relying the respective identities of the participating scope instances.

The scopes discussed herein may be any of a number of types of scopes. Table 1, below, lists exemplary scope types consistent with the invention. Table 1 is neither exhaustive nor mandatory; an embodiment consistent with this invention may define additional scope types or may choose to omit certain scope types from Table 1 as it is deemed appropriate to solve a given business problem. For example, a batch processing system may define a batch scope type and may refrain from using the request scope type as a batch system typically does not service any requests from clients.

TABLE 1

| Name | Accessible from | Period of Time |
|---|---|---|
| Method Scope (This scope may be configurable based on the needs of the application; a default may be to have a single Method Scope per message and per module) | All software artifacts accessed during method execution in the same module as the defining method, unless such artifacts are shielded by a nested Method Scope | Duration of the execution of the defining method (typical duration 1-50 msecs) |
| Request Scope | All software artifacts of an application on the server | Lifetime of the request from a given client (typical duration 10-1000 msecs) |
| Page Fragment Scope | All software artifacts on the server involved in rendering an iView or a Portlet on a Portal page | Lifetime of the iView or Portlet in a given client (typical duration 1 sec-5 mins) |
| Page Scope | All software artifacts on the server involved in rendering a complete page | Lifetime of the page on a given client (typical duration 1 sec-5 mins) |
| Client Scope (aka Application Session Scope) | All software artifacts of an application on the server which are accessible for the given client | Duration of interaction of a given browser instance with the server (typical duration 10 secs-10 mins) |
| Application Scope | All software artifacts of an application on the server | Lifetime of the application (typical duration greater than 1 hour) |
| (Server) Node Scope | All software artifacts on the server node | Lifetime of the server node (typical duration greater than 1 day) |
| Cluster Scope | All software artifacts in a cluster | Lifetime of the cluster (typical duration greater than 1 week) |
| Landscape Scope | All software artifacts in the landscape | Lifetime of the landscape (typical duration greater than 1 month) |
| Delegate Scope | All software artifacts accessed during credential delegation, e.g. for acting on behalf of another user | Lifetime of the delegation (typical duration 1 sec-5 mins) |
| User Scope (may include Anonymous User Scopes as children of the Anonymous Tenant - different anonymous users have different Anonymous User Scope instances) | All software artifacts in the user's realm | Lifetime of a single login session of the user, or lifetime of the client scope for anonymous users (typical duration 5 mins-5 hours) |
| Tenant Scope (may include a single Anonymous Tenant Scope as a parent of all Anonymous User Scopes) | All software artifacts in the landscape accessible to the tenant | Lifetime of the tenant in the landscape, or lifetime of the landscape for the Anonymous Tenant Scope (typical duration greater than 1 month) |
| Thread Scope | All software artifacts participating in the execution of the current thread | Lifetime of the thread's identity (possibly spanning multiple physical threads as long as they all have the same identity) (typical duration 10 msec-10 secs) |
| Business Process Scope | All software artifacts participating in the execution of a business process | Lifetime of the business process (typical duration greater than 1 min) |

Note that some scope types in Table 1 may exceed the life time of any given individual node. For example, the user scope or the cluster scope may continue to exist even if the particular node they were initially created on ceases to exist. Such long-lived scope types may be referred to as "virtual" scope types to indicate that they are not anchored to a particular node. Virtual scope types may be represented by a single scope instance that encompasses multiple nodes, such as message producers 110 and 120 and message consumer 140. Similar to other scope instance, the virtual instance may have a single globally unique ID. However, in contrast to non-virtual scope instances, the virtual scope instance may be represented by multiple context instances on different nodes, such as message producers 110 and 120 and message consumer 140, which are all accessible in parallel. System 100 may be in charge of maintaining multiple context instances of the virtual scope on the different nodes in sync to avoid any data corruption. This may be achieved, for example, by offering a central lock service which can be relied upon to update a context instance of the virtual scope instance in a conflict free way.

The instances of various scope types of Table 1 may be organized in a hierarchy. The hierarchy of scope instances may change dynamically at runtime (e.g., when a new user logs on to a system, a new user scope instance is inserted into the hierarchy and may henceforth be used to allocate resources for this user. When a request is completed, the corresponding request scope instance along with all its children is removed from the hierarchy. This dynamic hierarchy of scope instances may still rely on a well defined, stable type structure which may be configured at deploy time. This type structure, if defined, causes scope instances of a given type to always be inserted into the hierarchy between parents and children of certain fixed scope types rather than being inserted at arbitrary levels of the hierarchy. The type structure thereby contributes significantly to a better structure and better manageability of the overall dynamic hierarchy at runtime.

Lifecycle of Scopes and Resources

The scope instances of hierarchy 500 may represent various types of scopes. For example, the resource managers 110-5, 120-5, and 140-5 (FIG. 1A) may collaboratively maintain a user scope instance that is the parent of all client scope instances for a given user, and across all computer infrastructure instances within the user's security realm. At the same time, one of resource managers 110-5, 120-5, and 140-5 may maintain an application scope instance as a parent of the client scope instance of this user on a single computer infrastructure instance, thus reflecting the fact that an application session is usually owned by the combination of a user and an application. When one of the resource managers 110-5, 120-5, and 140-5 explicitly or implicitly releases one of the parent scope instances, then all of the parent's child scope instances (and thus all of the resources associated with the child scope instances) may released as well. For example, when a user signs out, all resource managers in the user's security realm may release the associated user scope instance and the resource managers 110-5, 120-5, and 140-5 may each release all client scopes of that user on systems 110, 120 and 140, respectively. Closing down an application on message producer 110 may trigger the release of all client sessions for that application living on that producer but leaves untouched any client sessions of other applications on message producer 110, as well as any client sessions of any applications executing on message producer 120 or message consumer 140. Message producer 110 may allow a user to transparently resume the client session for the application on a different node (e.g. in a different application scope instance on message producer 120) by replicating the client scope instance's context to a different message producer prior to the cleanup, as discussed in more detail below.

System 100 may enforce a defined lifespan for scope instances 510, 520, 530, 540, and 550 using one or more of resource management modules 110-5, 120-5, and 140-5. When system 100 determines that a scope instance is at the end of its life, e.g. due to a timeout or due to a parent being at the end of its life, it may releases the scope instance along with any resources that have been allocated in its context during the life of the scope instance. For virtual scope instances, the one of the message producers 110 and 120 and message consumer 140 triggering the cleanup of the scope instance may also notify any related computer infrastructure instance to clean up any context of this scope instance.

A developer may have the option of manually releasing certain scope instances at any point in time, for example by deleting an existing client scope instance. Additionally, a developer may ensure that resources remain available beyond the lifetime of its initial scope instance by performing resource promotion, as set forth below. In some embodiments, a developer may also request that the life cycle of a given scope instance be extended, e.g. by resetting the timeout value for a given scope. However, such a request, if granted by message producers 110 or 120 or message consumer 140, may only be valid for a defined period of time to ensure that the developer does not circumvent the scope instance's lifecycle management through the infrastructure of message producers 110 or 120 or message consumer 140.

Resource management modules 110-5, 120-5, or 140-5 may promote an existing resource to a new or broader scope instance, which may cause the resource to be removed from its previous scope instance. For example, an object initially allocated in a request scope instance may be promoted to a client scope instance to ensure that it continues to be available on the next request from the client. Another example is to expose a return value or an exception outside of a method call which executes in its own method scope instance. The return value or exception may be used to pass any relevant results, initially allocated inside the method's scope instance, to the caller of the method. This may cause these results to survive the end of the method's scope instance and to be moved to the parent of the method scope instance.

Resource promotion may only be possible inside the scope hierarchy 500 (i.e. a developer may promote a resource from a given scope instance to one of its direct parents), and may increase the visibility of the resource.

Resource management modules 110-5, 120-5, and 140-5 may tear down short-lived scope instances when their lifetime is over, thereby releasing all resources allocated in that scope. For certain long-lived scope instances, the message producers 110 or 120 or message consumer 140 may allow the developer to request an explicit resource deallocation prior to the end-of-life of this scope instance. This may be achieved by means of a dedicated API exposed on the corresponding scope type, e.g. on the client or on the application scope type. In one embodiment, a scope instance (which at first is merely a logical concept) may be represented by an object instance at runtime (which is a physical representation of the logical concept in computer memory). For example, a session scope instance may be represented by a session scope object instance, as in the case of the Java Enterprise Edition Servlet Standard. Since there can be many parallel session scope instances, there can also be many parallel session scope object instances at runtime (namely, one per user and application).

This scope object exposes certain APIs for use by any interested parties, such as a method to end the life time of this scope object instance (implying end of life of the associated scope instance). In particular, the scope object may also expose a method to deallocate a resource which currently lives in this scope instance and which therefore is stored as part of the internal context of the scope object instance. If the developer invokes this method on the object instance, passing in a reference to the resource to be deallocated, then the resource is explicitly removed from the scope object instance.

For long-lived scope types which do not expose an explicit API for removing data, the context of the corresponding scope instances may be cleaned up as necessary by the resource management modules 110-5, 120-5, and 140-5. In particular, some long-lived scopes may benefit from a regular "traditional" garbage collection based on reference counting to release unused storage.

Context Replication

Figure 6A:
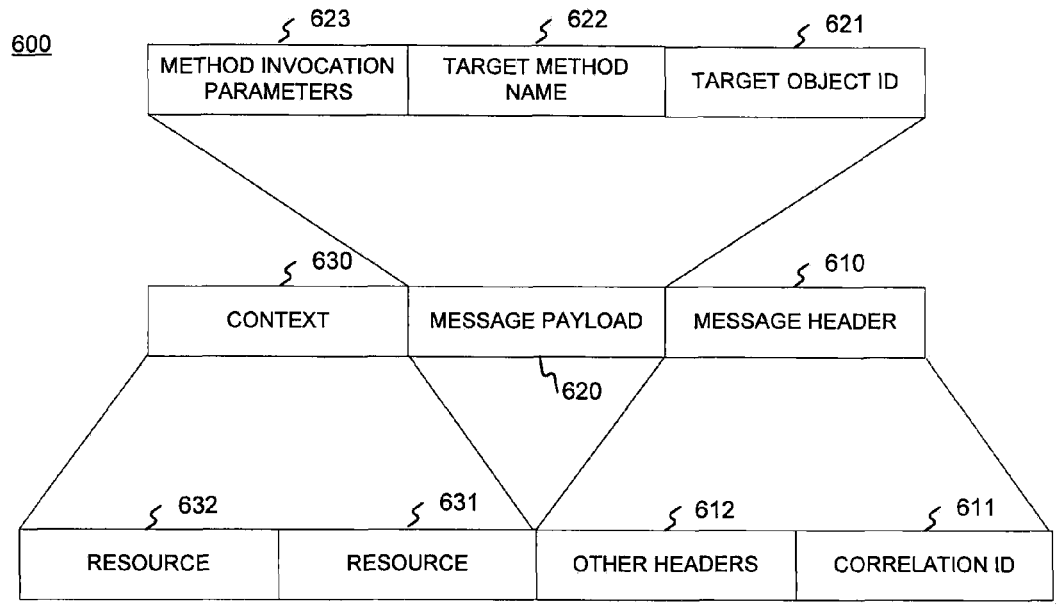
FIG. 6A illustrates an exemplary request message, consistent with the present invention.

Resource management modules 110-5, 120-5, and 140-5 may go beyond managing resources inside a given instance of their respective infrastructures, and may use scope contexts to transparently share related groups of data between message producers 110 and 120 and message consumer 140. FIG. 6A depicts an exemplary message 600 for transparently sharing context data between message producers 110 and 120 and message consumer 140. Message 600 may include a message header 610 and a message payload 620. The message header 610 may include, for example, a correlation ID 611 and a other headers 612. The message payload 620 may include, for example, a target object ID 621, a target method name 622, and/or a set of method invocation parameters 623. In one embodiment, a context 630 for a scope associated with the message may be attached to or included in the message 600. The context may include resources 631 and 632 allocated to the scope associated with the message. This may allow message producers 110 and 120 and message consumer 140 to transparently share related groups of data between them. This embodiment of the invention thus relies on ongoing requests between source and target systems to transparently share the context data among all interested parties, and may be appropriate for cases where the context instance contains only a small amount of data.

Figure 6B:
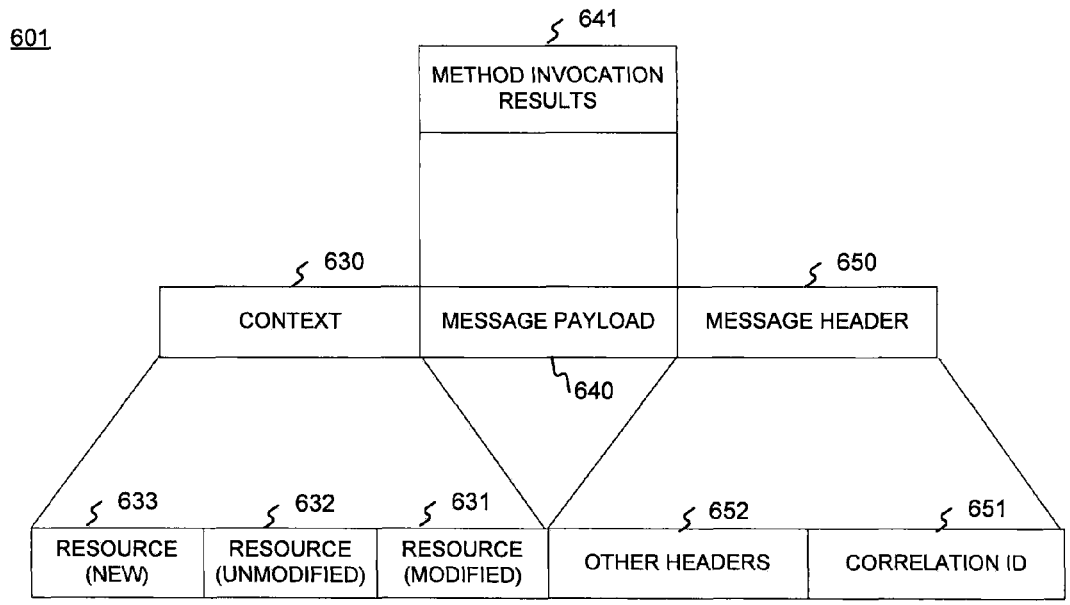
FIG. 6B illustrates an exemplary response message.

FIG. 6B depicts the corresponding response message 601 which may be logically associated with the request message 600 by means of correlation IDs 611 and 651 in the respective message headers 610 and 650. The message header 650 may also include other headers 652. The response message transports the results of the method invocation back to the originating system. That is, the message payload 640 may include method invocation results 641. In one embodiment, a context 630 for a scope may be attached to or included in message 601. This context has the same logical identity as the context 630 attached to message 600 but may contain modified or new resources which were allocated during the processing of the method invocation on the target system. That is, context 630 may include a modified resource 631, an unmodified resource 632, and/or a new resource 633.

Figure 7:
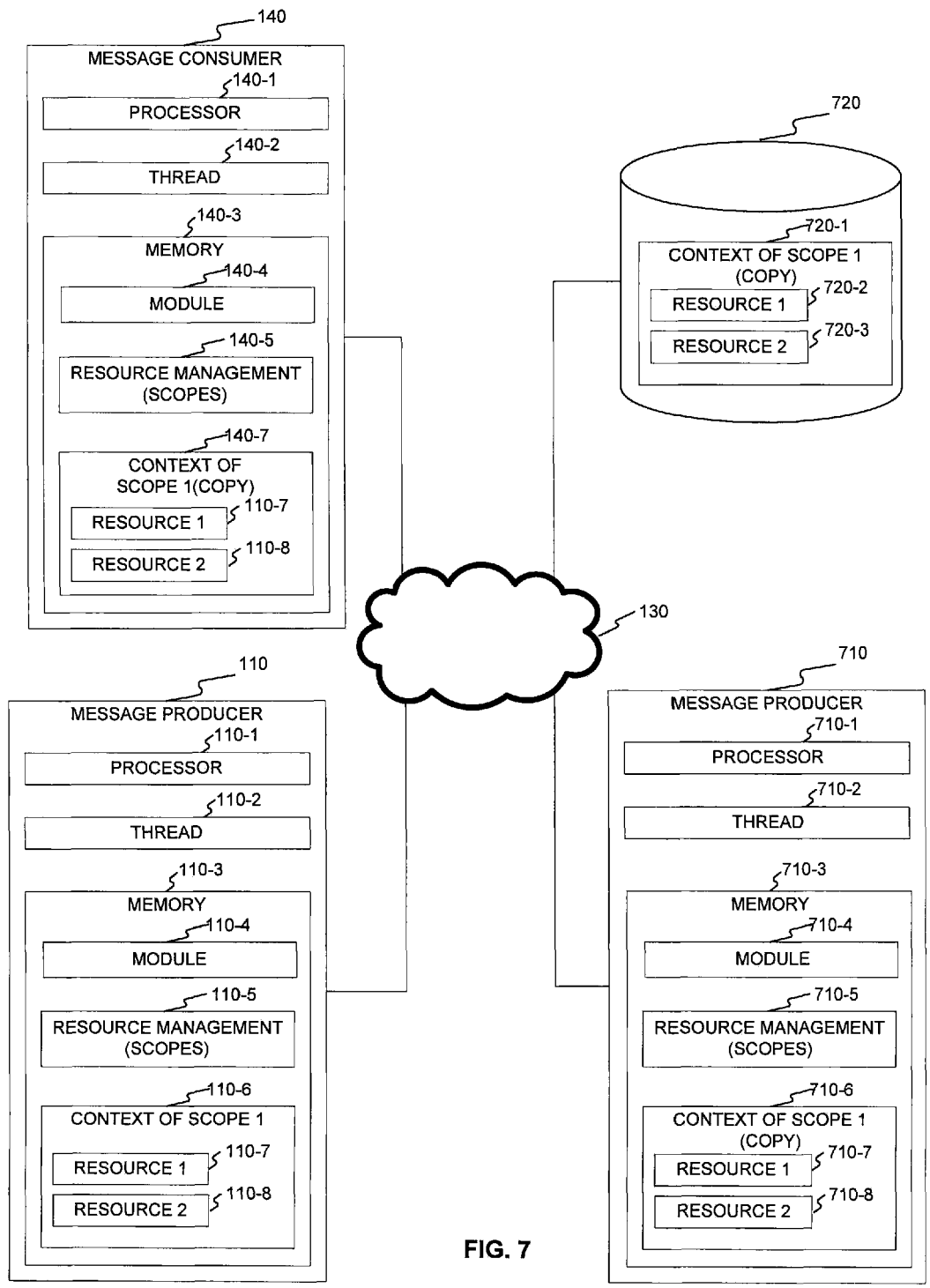
FIG. 7 illustrates an exemplary system for replicating scope contexts; consistent with the present invention.

FIG. 7 depicts several alternate embodiments of replicating scopes. These embodiments have in common that they rely on out-of-band context replication (i.e., replication independent of any ongoing request to the target system), and may be more appropriate than the message based approach described above in those cases where context instances contain large amounts of data. For example, resource management module 110-5 may proactively replicate the context of a client scope instance to a standby message producer 710, to message consumer 140 or to a database 720. After an initial copy, subsequent replication efforts may be limited to synchronizing the latest changes to the various copies of the context, thus reducing the amount of data being transferred. Message producer 110 may communicate with database 720, message consumer 140, and standby message producer 710 over communication network 130. Message producer 710 may be similar in structure to message producer 110 including, for example, a processor 710-1, a thread 710-2, and a memory 710-3 for storing a replica 710-6 of context 110-6 along with a copy 710-4 of module 110-4, both managed by resource management 710-5. The replica 710-6 may include a replica 710-7 of resource 110-7 and a replica 710-8 of resource 110-8. Similarly, database 720 may store a context replica 720-1 including a resource replica 720-2 and a resource replica 720-3.

Individual elements in a scope instance may also be replicated to message consumer 140 on demand. This approach may be used in cases when something less than the entire scope instance is needed on message consumer 140. For example, when a child scope instance has been replicated from message producer 110 to message consumer 140 and refers to individual elements of one of its parents in hierarchy 500 then these elements also need to be made available on message consumer 140. Since these references only target individual elements of the parent scope instance a replication of the entire context of the parent scope instance may not be advisable for performance reasons. In such a case, message consumer 140 may choose to request an individual element of the parent scope from message producer 110 on demand.

Replicating a scope context may not extend the lifetime of the original scope instance. Rather, a secondary scope context may be created with its own, independent lifecycle which just happens to contain a copy of the resources of the original scope context. This may be necessary to maintain the overall structure and ownership relations of the scope hierarchy 500. In the example above, the replicated client scope context on the standby message producer 710 may have its own lifecycle. In particular, if the standby message producer 710 is shut down for administrative reasons, the replicated client scope context may also need to be closed. This may not impact the origin scope instance in any way, except that the computer hosting the origin scope instance may need to create another replicated client scope instance on a new standby node.

Transparent Distribution and Module Updates

If message producer 110 dies unexpectedly, the client may continue its work on the standby message producer 710 by accessing the replicated context 710-6 from a new client scope instance which has been created on message producer 710 during failover processing. The new client scope instance can also load the content of the failed context on message producer 110 by accessing the replicated context 720-1 of database 720.

For transparent distribution, message producer 110 may similarly replicate context 110-6 to message consumer 140 by out-of-band replication so that messages having a scope instance associated with context 110-6 can be processed by the message consumer 140.

Figure 8:
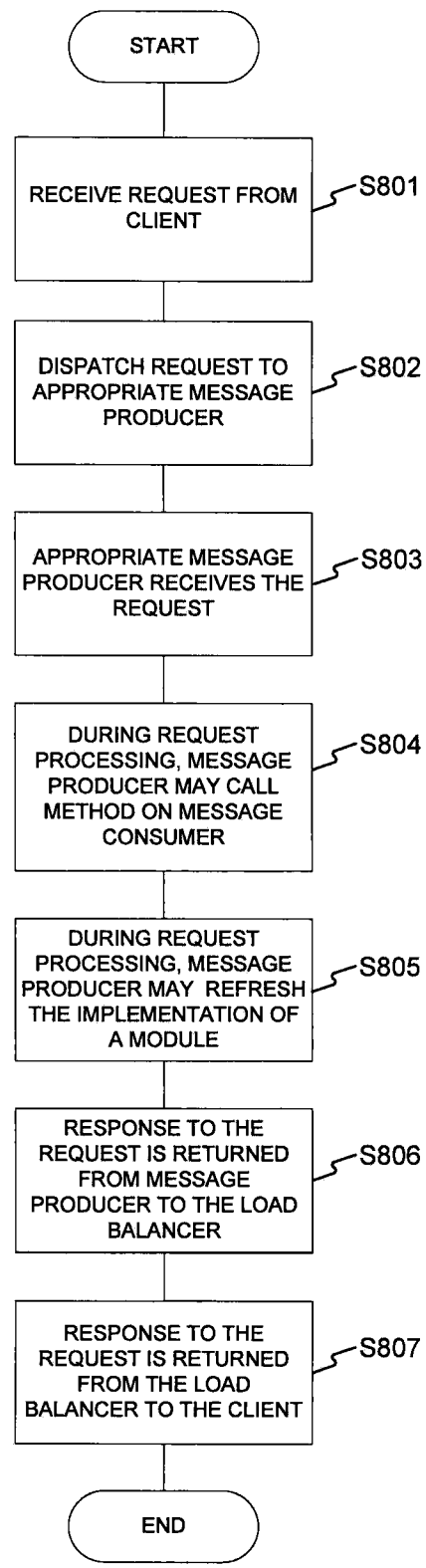
FIG. 8 illustrates an exemplary process for load balancing, consistent with the present invention.

FIG. 8. depicts a process for distributing load for the end-to-end processing of client requests, consistent with the invention. A client request may include, for example, an HTTP request. To distribute the request processing load, a load balancer may receive a request from a client (S801) and determine an appropriate message producer 110 or 710 to dispatch the incoming request to (S802). The load balancer may rely on its current configuration and on internal algorithms for making that determination, such as the knowledge of previous routing decisions of the load balancer, a routing policy, the current load on each of the available message producers as well as scheduled downtimes of the available message producers. The selected message producer 110 or 710 receives the request from the load balancer and starts processing it (S803). During this processing, the message producer 110 or 710 may choose to invoke various methods on objects in local or remote modules (S804). The details of performing these method invocations follow the steps outlined in FIG. 2, thereby guaranteeing a high degree of network transparency even when invoking remote modules. For example, the message producer 110 or 710 may take advantage of this capability to shift some load to other systems which it itself cannot currently handle, or to enforce certain security constraints which limit critical processes to dedicated system instances in the network other than message producers 110 or 710. During the request processing, the message producer 110 or 710 may also choose to refresh the implementation of module 110-4 or 710-4 (S805), following the steps outlined below and in FIG. 10. After completing processing of the request, the response is returned to the load balancer (S806) and from there to the client (S807).

Independently of the actual request processing, message producers 110 and 710, message consumers 140 or databases 720 may be active in the background to ensure that all scope context instances remain synchronized between these different systems, following the out-of-band context replication mechanism described in FIG. 7. In particular, this may apply to those context instances which have been modified during request processing to ensure that the impact of a possible unexpected outage of one of these systems is minimized. Also independently of the actual request processing, each one of these systems may request from the load balancer to be assigned more or less load from new incoming client requests, depending on each system's currently available capacity.

Figure 9:
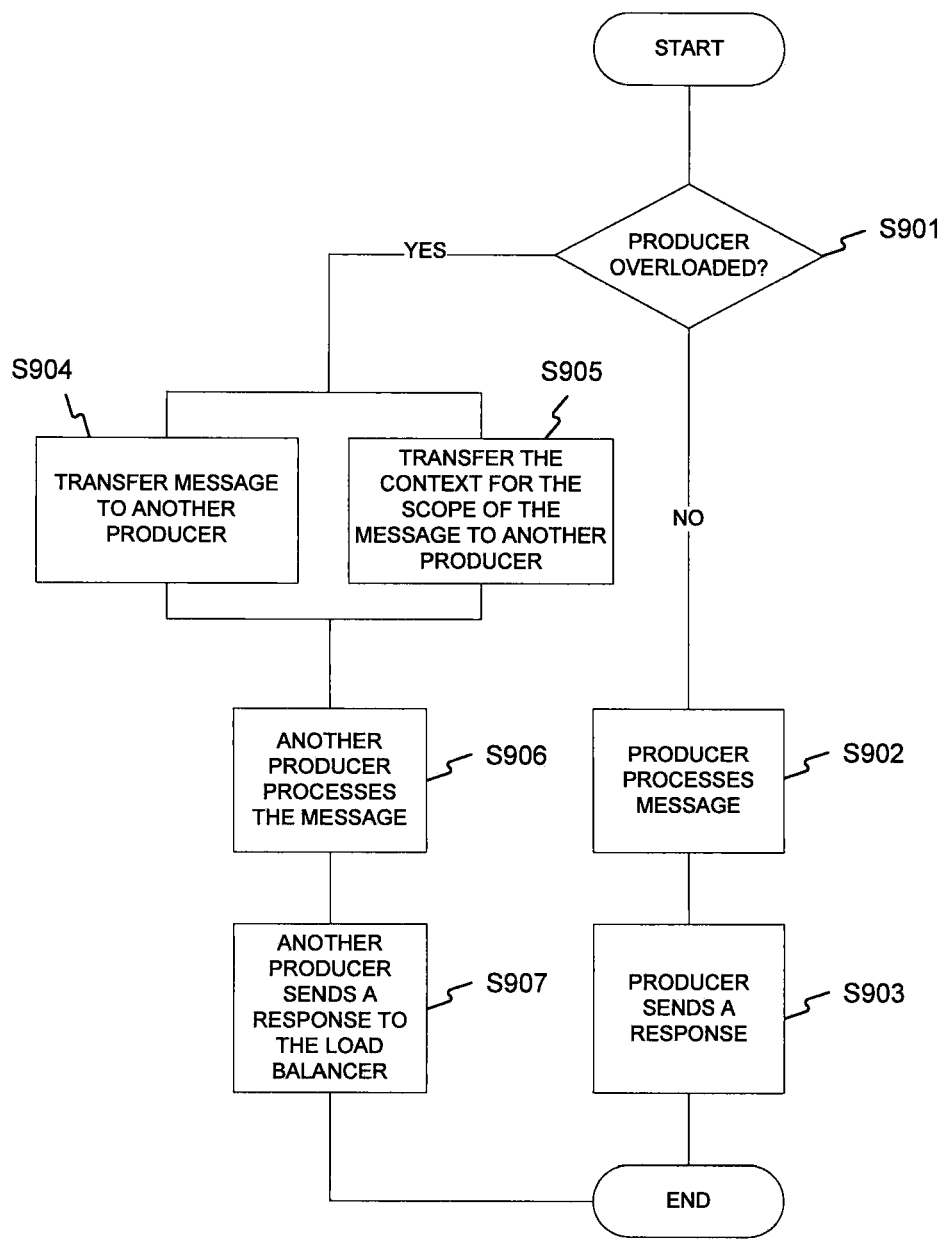
FIG. 9 illustrates an additional exemplary process for balancing load, consistent with the present invention.

FIG. 9 depicts another process for distributing load for processing messages, consistent with the invention. A message producer 110 may determine whether it is overloaded (S901) even while it is already processing a given request from a client. If message producer 110 determines that it is not overloaded, processing may continue on message producer 110 as usual by processing the message and sending a response (S902 and S903). If message producer 110 determines that it is overloaded, it may transfer message 110-10 (S904) and a context 110-6 for the scope associated with the message (S905) to another message producer 710. Message producer 710 may then process message 110-10 using a copy 710-4 of context 110-6 (S906) and may subsequently return the response to the request directly to the load balancer (S907). A similar mechanism may allow a message consumer 140 which is already processing a given request to shift load dynamically to another message consumer (not shown).

Figure 10:
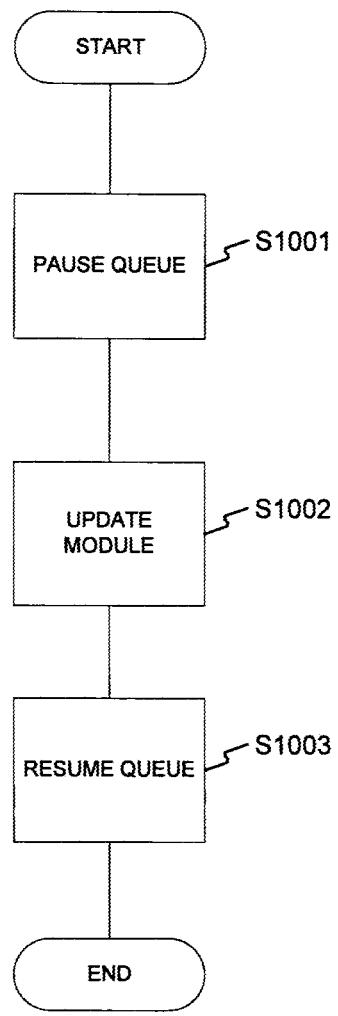
FIG. 10 illustrates an exemplary process for updating a module, consistent with the present invention.

FIG. 10 depicts an exemplary process for updating a module while system 100 remains on-line, consistent with the invention. When it is determined that a module, such as module 140-4, needs to be updated, message consumer 140 may pause the consumption of messages from queue 140-6 by module 140-4 (S1001). Then, queue 140-6 may continue to queue incoming messages while message consumer 140 updates module 140-4 (S1002). After module 140-4 is updated, module 140-4 can resume processing messages from queue 140-6 (S1003). So long as queue 140-6 does not overflow with messages, the updating of module 140-4 may remain transparent to message producers 110 and 120. Additionally, before processing of messages by module 140-4 can resume, message consumer 140 needs to ensure that the messages stored in queue 140-6 or the copies of the resources stored in contexts 140-7 and 140-8 are compatible with the type declarations in the updated module 140-4. This may be necessary to prevent type compatibility errors after resuming message processing.

Implementation Variants

The systems and methods disclosed herein may be embodied in various forms including, for example, a data processor, such as a computer that also includes a database or a network of embedded devices which individually may not have any capability to persist data. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer-readable storage media that include program instructions or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by a computer using an interpreter.

Unless expressly stated otherwise, various steps in the disclosed methods need not be performed in the exact order listed herein. Instead, they may be performed in different orders, as is well-known to those skilled in the art.

The foregoing description of possible implementations consistent with the present invention does not represent a comprehensive list of all such implementations or all variations of the implementations described. The description of only some implementations should not be construed as an intent to exclude other implementations. One of ordinary skill in the art will understand how to implement the invention in the appended claims in many other ways, using equivalents and alternatives that do not depart from the scope of the following claims.

What is claimed is:

1. A method for decoupling modules in a computer system, comprising:
    sending a message, by a first module in a first host, to a second module in a second host by means of asynchronous messaging;
    maintaining, in scopes managed in a scope hierarchy, a context containing one or more resources needed to process the message;
    sending, to the second host, a copy of the context;
    pausing the first module;
    receiving a response indicating that the message has been processed by the second module;
    receiving, from the second host, updates to the copy of the context;
    incorporating the updates into the context in the scope hierarchy; and
    resuming the first module on the first host.

2. The method of claim 1 wherein the sending of the message and the sending the copy of the context are transparent to the first module and the second module.

3. The method of claim 1, wherein receiving the response includes receiving a reply message at the first host from the second host.

4. The method of claim 1, wherein the copy of the context is attached to the message as an in-band copy.

5. The method of claim 1, further comprising sending the copy of the context to the second host separate from the message as an out-of-band copy.

6. The method of claim 5, wherein sending the context to the second host comprises proactively copying the context on behalf of the first host.

7. The method of claim 5, wherein sending the copy of the context comprises copying the context on demand of the second host.

8. The method of claim 1, wherein the context needed to process the message is identifiable in the hierarchy of scopes.

9. The method of claim 1, further comprising placing the message in a message queue.

10. The method of claim 9 further comprising:
pausing the queue,
updating the second module, and
processing the request message from the queue after the second module is updated.

11. The method of claim 9, further comprising:
providing a series of second hosts configured to process the message based on the copy of the context; and
using a load-balancer to route the message to more than one of these hosts.

12. A non-transitory computer-readable medium storing instructions for executing a method for decoupling modules in a computer system, the method comprising:
sending a message, by a first module in a first host, to a second module in a second host by means of asynchronous messaging;
maintaining, in scopes managed in a scope hierarchy, a context containing one or more resources needed to process the message;
sending, to the second host, a copy of the context;
pausing the first module;
receiving a response indicating that the message has been processed by the second module:
receiving, from the second host, updates to the copy of the context;
incorporating the updates into the context in the scope hierarchy;
resuming the first module on the first host.

\* \* \* \* \*